United States Statutory Invention Registration [19]

[11] Reg. Number: H141

Finnerty et al. [43] Published: Oct. 7, 1986

[54] FAST DISPENSING FIRE EXTINGUISHER

[75] Inventors: Anthony E. Finnerty, Forest Hill; Lowell K. Bryant, Joppa; Charles R. Stumpfel, Baltimore, all of Md.

[73] Assignee: The United States of America as represented by the Secretary of the Army, Washington, D.C.

[21] Appl. No.: 722,034

[22] Filed: Apr. 11, 1985

[51] Int. Cl.[4] ..... A62C 35/02
[52] U.S. Cl. ..... 169/28
[58] Field of Search ..... 169/28, 35, 36

[56] References Cited

U.S. PATENT DOCUMENTS

| | | | |
|---|---|---|---|
| 883,856 | 4/1908 | Bowman | 169/28 X |
| 1,565,036 | 12/1925 | Tank | 169/36 |
| 2,073,416 | 3/1937 | Finzl | 169/28 |
| 2,373,819 | 4/1945 | Eaton | 169/28 |
| 2,450,569 | 10/1948 | Thompson | 169/28 |
| 2,787,330 | 4/1957 | Mathisen | 169/28 |
| 3,482,637 | 12/1969 | Mitchell et al. | 169/28 X |

*Primary Examiner*—Harold J. Tudor
*Attorney, Agent, or Firm*—Anthony Lane; Robert Gibson; Edward F. Costigan

[57] ABSTRACT

There is disclosed a fire extinguisher which is not pressurized and is made of thin walled light weight molded plastic or a metal container or a mixture thereof. The container is full of fire extinguishing agent. An explosive device, preferably a detonating cord is in the container which when activated causes gas and shock pressure to burst the container instantaneously expelling the fire extinguishing agent onto the fire being treated.

10 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 4
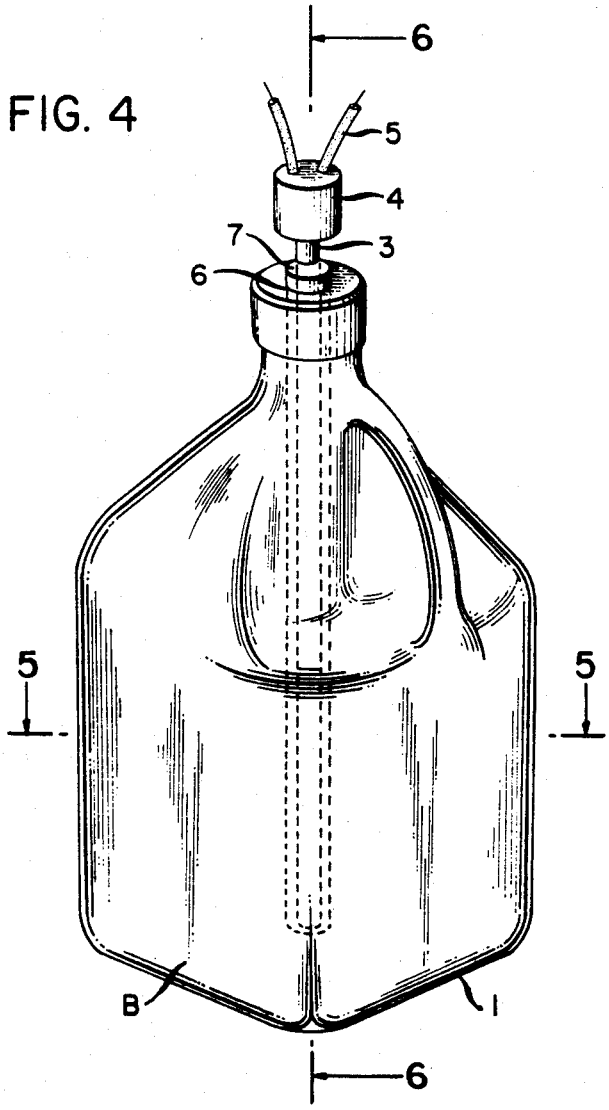
FIG. 5
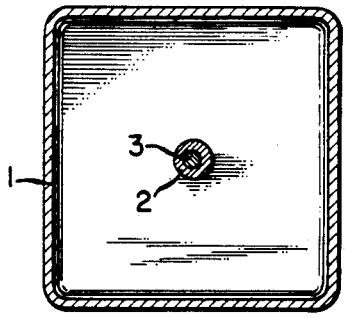
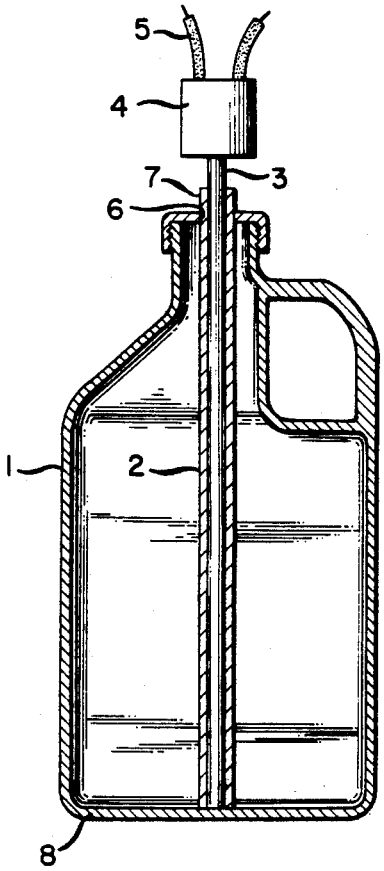
FIG. 6

FAST DISPENSING FIRE EXTINGUISHER

GOVERNMENT RIGHTS

The invention described herein may be manufactured, used and licensed by or for the Government for Governmental purposes without the payment to us of any royalties thereon.

BACKGROUND OF THE INVENTION

Presently used fire extinguishers which dispense solid or liquid fire extinguishing agents are containers made of pressure resistant metal because the fire extinguishing agent is stored under pressure in them. The ordinarily used containers are steel. This makes the containers heavy and difficult to handle. In order to provide a means to dispense all the fire extinguishing agent from the container, a "head space" of 25% of the volume of the container is needed. This increases the amount of space needed to store the fire extinguishers and is significant where large fire extinguishers or many fire extinguishers are used to protect an area.

The fire extinguishing agent is dispensed from the fire extinguishers through a valve. The valves of conventional fire extinguishers are opened either manually, electrically, thermally or with a squib. The electrical or squib actuated valves operate rapidly, but, the volume dispensed is a function of the size of the valve orifice, which in most cases is of insufficient size to permit substantially instantaneous dispensing of the fire extinguishing agent. Thus, the known fire extinguishers are not suitable for extinguishing fast moving fires like ammunition fires or vehicular fires. These types of fires require large amounts of extinguishing agent in a very short time since, as is known in the fire extinguishing art, the faster that a given amount of fire extinguishing agent is applied to a fire, the greater is the probability that the fire will be extinguished. Because of the time needed to dispense the fire extinguishing agent, more agent is needed to extinguish a fire than if all the agent in a fire extinguisher is dispensed simultaneously. In mining, grain elevators, oil well drilling operations and other dangerous situations, large instantaneous applications of fire extinguishing agents are required to achieve maximum effect.

There is thus a need for a fire extinguisher which will enable all its contents of fire extinguishing agent to be instantaneously applied to a fire and which can be more easily stored safely with smaller space requirements than conventional fire extinguishers.

BRIEF SUMMARY OF THE INVENTION

This invention provides non-pressurized rapidly dispensing lightweight fire extinguishers comprising a shaped hollow container with an orifice for receiving a fire extinguishing agent and an explosive device, e.g. a detonating cord, wherein the container is an easily burstable lightweight plastic or thin walled metal. There is a means, e.g. a detonator activated by electricity, heat and the like, for detonating the explosive device, e.g. detonating cord, which creates gas or shock waves or both, causing the container to burst and instantaneously dispense all the fire extinguishing agent in the container. The detonator is an electrically initiated detonator which is outside the container and is operatively connected at one end to the explosive device, e.g. to one end of the detonating cord, and at the other end to electrical leads which can be attached to a source of electricity.

The container walls can be scored to provide weakened areas for ease of bursting and for controlling the direction the fire extinguishing agent is dispensed.

BRIEF DESCRIPTION OF THE DRAWINGS

FIG. 4 is a perspective view of a fire extinguisher of this invention in which the container therein is a square bottle shape;

FIG. 5 is a sectional view taken along line 5—5 of FIG. 4;

FIG. 6 is a sectional view taken along line 6—6 of FIG. 4.

DETAILED DESCRIPTION OF THE INVENTION

Figure 1:
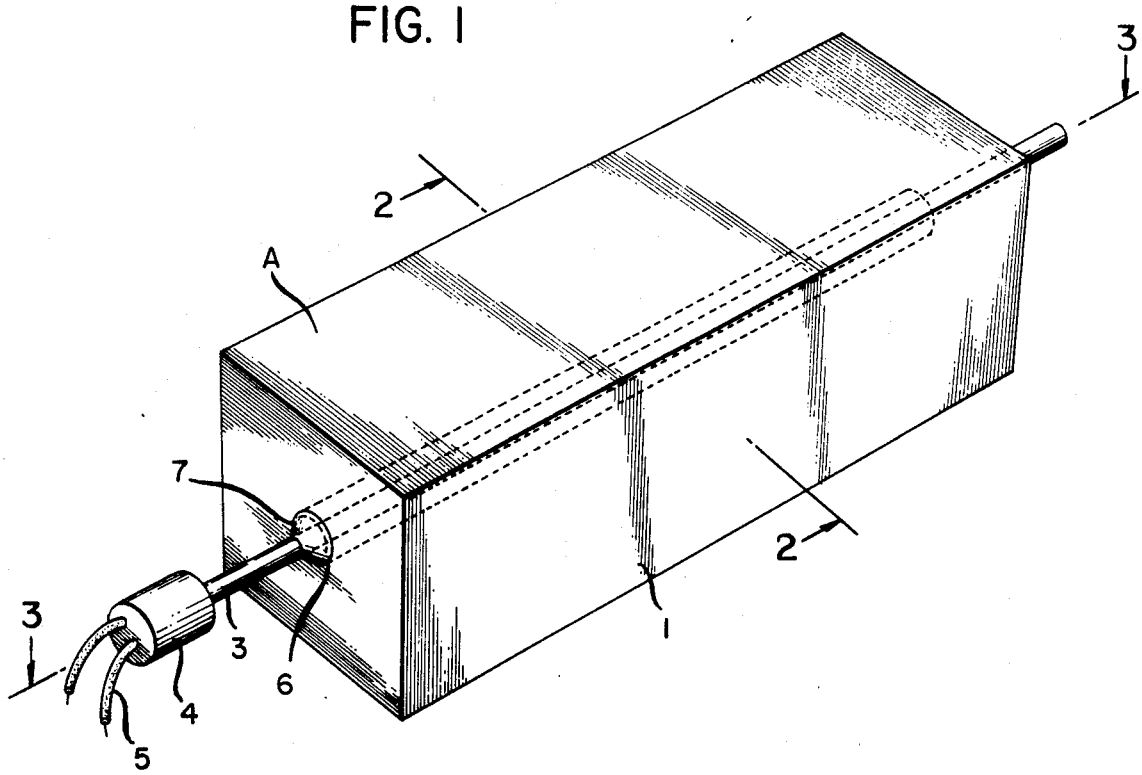
FIG. 1 is a perspective view of a fire extinguisher of this invention in which the container therein is shaped rectangularly.

The container of the fire extinguisher of this invention is made of a lightweight plastic or thin metal sheet, each of which are inert to any fire extinguishing agent which might be stored therein. The size and shape of the container is dictated by the type of fires it is intended to extinguish and the space available to store them. Because the container is completely full, more extinguishing agent for a given amount of space can be utilized. The shape of the container can be molded to fit any required space, including those where conventional extinguishers cannot be accommodated. Thus, for example, the ceiling of a storage shed or trailer can have a fire extinguisher of this invention cover a large surface thereof, whereas conventional fire extinguishers would have to hang on the walls. Since the fire extinguishers of this invention do not need to be hand operated, they can be placed in out of reach places which are more strategic than hand operated devices can be positioned. The plastics which are suitable for use in making the containers used in the fire extinguishers of this invention are those which are easily molded and which are inert to the fire extinguishing agents used, typical of such plastics are polyethylene, polypropylene, polytetrafluoroethylene, acrylics, polycarbonates, polyvinyl chlorides and rubbers. Metals which are suitable for making the containers are those which can be formed into lightweight sheets that are weak enough to be burst upon the activation of the explosive device, e.g. detonating cord, (hereinafter "detonating cord" will be used for convenience in the description of the invention although other explosive devices are contemplated) and which are inert to the fire extinguishing agents used. Typical suitable metals are aluminum and its alloys, and thin steel sheets. The container can also be made from both metal and plastic.

The walls of the containers need be strong enough to contain the contents but weak enough to break or shatter when the extinguisher is activated. It is convenient to score the walls of the container so they will break easier and in predetermined places so the extinguishing agent is dispensed in the desired direction rather than in all directions at once.

The extinguishing agent can be liquid, solid or mixtures, e.g. powder or granular, aqueous solutions or aqueous mixtures with powders or granules therein. The fire extinguishing agent is loaded into the container by conventional means through an orifice in the container. The same orifice is used to load the detonating cord into the container, usually after the extinguishing agent is loaded. The cord is relatively rigid and reaches to the wall of the container opposite the loading orifice, e.g. the bottom, if the container is bottle shaped. The cord may be coated with a material inert to the extinguishing agent. However, a preferred method of protecting the cord is to insert into the orifice of the container a protecting tube made of material inert to the extinguishing agent.

The protecting tube reaches to the wall, or bottom in case of a bottle shape, opposite the orifice and is inserted prior to or with the detonating cord. The detonating cord can extend through a hole in the wall opposite the loading orifice, but need not. The tube must be weak enough to rupture when the detonator cord is detonated. Once the container is loaded with the extinguishing agent, protective tube (if used) and detonating cord, a detonator can be attached to the detonating cord, then the edges of the orifice and rear hole (if present) are sealed.

A detonator is used if the detonating cord is not sensitive enough to detonate when heated by a fire or other means not requiring a detonator. The preferred types of detonators are conventional electrically activated or squib activated. The power source can be an electrical source from, for example, a fire detector or smoke detector.

The choice of fire extinguishing agents depends on the type of fire to be extinguished, e.g. petroleum fuel, propellants, pyrotechnic mixtures, paper and the like, including those mentioned above. Also the nature of the surroundings is a factor, thus, one would avoid salt or aqueous extinguishing agents in the vicinity of electrical systems.

The following are typical suitable fire extinguishing agents: water; water and ethylene glycol; water and foaming agents; water, ethylene glycol and foaming agents; water and inorganic salts such as alkali metal chlorides, e.g. sodium chloride, lithium chloride; water, foaming agents and alkali metal chlorides; water and propylene glycol; water, propylene glycol and foaming agents; phosphate salts, e.g. monoammonium phosphate, diammonium phosphate, potassium phosphate; and high boiling haloalkanes such as bromochloro methane (Halon 1011).

The invention can be better understood with reference to the drawings.

Figure 2:
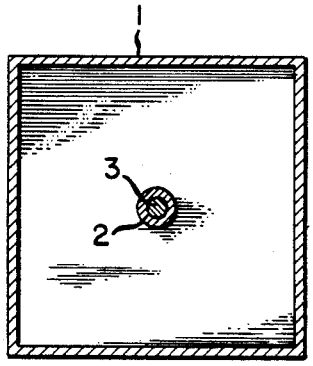
FIG. 2 is a sectional view taken along line 2—2 of FIG. 1.
Figure 3:
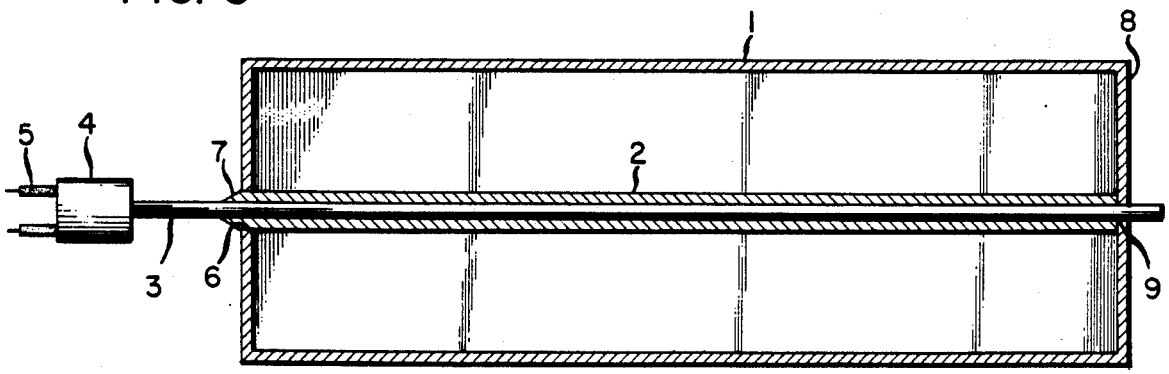
FIG. 3 is a sectional view taken along line 3—3 of FIG. 1.

FIGS. 1, 2 and 3 depict a rectangular parallelepiped container A with thin plastic and/or metal walls 1. The shape is one possible shape as explained above. An orifice 6 is at one wall of the container A. The fire extinguishing agent is loaded into the container A through a loading orifice 6. Then a protective tube 2 is inserted into the container A through the loading orifice 6. The tube 2 extends the length of the container A. Then a detonating cord 3 is inserted through the loading orifice 6 and can reach the entire length of the container A or extend beyond the rear wall 8 through a hole 9 therein. Attached to the detonating cord 3 on the end thereof extending from the loading orifice 6 is a detonator 4 with electric leads 5. The detonator 4 as explained above is a preferred embodiment but is not essential to the invention. The loading orifice 6 is sealed with a sealing gasket 7.

FIGS. 4, 5 and 6 depict a bottle shaped fire extinguisher B. The numerals refer to the identical parts defined for those numerals in FIGS. 1, 2 and 3. In the bottle embodiment, the protective tube 2 and the detonating cord 3 both rest on the bottom inside surface 8 of the bottle.

The fire extinguisher of this invention operates as described for the following typical embodiments:

When an electrical signal is imposed on the electrical leads 5, the detonator 4 functions, causing the explosive material contained in the detonating cord 3 to explode. Gases generated by the explosion split the protective tube 2, instantaneously pressurizing the fire extinguishing agent in the container A or B causing the walls 1 and 8 to rupture allowing all the fire extinguishing material to be expelled instantaneously.

When operated on a fire started in the propellant section of a tank gun round, the device of this invention extinguished the fire in 10 milliseconds using as the fire extinguishing agent six liters of water and 2 liters of foaming agent. Nine grams of explosive were used to detonate the fire extinguisher.

In another test, 23 kilograms of burning, compartmentalized M30 propellant was extinguished in 60 milliseconds using 36 liters of extinguishing agent consisting of 30 liters of water and 6 liters of foaming agent. Eighteen grams of explosive were used in the fire extinguisher in which the container was made of metal and plastic.

We claim:

1. A non-pressurized, lightweight, rapidly dispensing fire extinguisher consisting essentially of:

a hollow shaped container having an orifice, a fire extinguishing agent in said container, an explosive device operatively fitted in said container through said orifice, said container made of a burstable lightweight thin wall metal or plastic, and means for detonating said explosive device to burst said container and instantaneously disperse all fire extinguishing agent in said container.

2. The fire extinguisher of claim 1 wherein the explosive device is a detonating cord.

3. The fire extinguisher of claim 2 wherein the means for detonating said detonating cord is an electrically initiated detonator.

4. The fire extinguisher of claim 2 wherein the detonator cord contains a gas-producing explosive.

5. The fire extinguisher of claim 2 wherein the detonating cord is protected by a covering which is inert to any fire extinguishing agent in said container.

6. The fire extinguisher of claim 5 wherein the protective covering for the detonating cord is a pipe adapted to burst upon detonation of said cord.

7. The fire extinguisher of claim 1 containing a sufficient amount of a fire extinguishing agent to extinguish propellant fires.

8. The fire extinguisher of claim 1 containing sufficient amount of a fire extinguishing agent to extinguish a petroleum fire.

9. The fire extinguisher of claim 1 wherein said container is substantially completely full of fire extinguishing agent.

10. The fire extinguisher of claim 9 wherein the fire extinguishing agent is selected from water; water mixed with either ethylene glycol, foaming agents, lithium chloride, sodium chloride, or mixtures thereof; monoammonium phosphate; diammonium phosphate; potassium phosphate or high boiling point halogenated hydrocarbons.

* * * * *